United States Patent

Maringanti et al.

(10) Patent No.: US 11,570,176 B2
(45) Date of Patent: Jan. 31, 2023

(54) SYSTEM AND METHOD FOR PRIORITIZATION OF TEXT REQUESTS IN A QUEUE BASED ON CONTEXTUAL AND TEMPORAL VECTOR ANALYSIS

(71) Applicant: Bank of America Corporation, Charlotte, NC (US)

(72) Inventors: Sreekanth Raghuveer Maringanti, Hyderabad (IN); Madhusudhanan Krishnamoorthy, Chennai (IN); Urmila Shetty, Secunderabad (IN); Surjeet Singh, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 72 days.

(21) Appl. No.: 17/160,501

(22) Filed: Jan. 28, 2021

(65) Prior Publication Data

US 2022/0239651 A1 Jul. 28, 2022

(51) Int. Cl.
*H04L 9/40* (2022.01)
(52) U.S. Cl.
CPC .................... *H04L 63/10* (2013.01)
(58) Field of Classification Search
CPC ..... H04L 47/6275; H04L 67/62; H04L 67/60; H04L 67/61; H04L 67/63; H04L 51/226; G06Q 10/06; G06F 9/5005; G06F 9/5038; G06F 9/4881; G06F 9/4887
See application file for complete search history.

(56) References Cited

U.S. PATENT DOCUMENTS

| | | | |
|---|---|---|---|
| 3,648,253 A | 3/1972 | Mullery et al. | |
| 4,110,823 A | 8/1978 | Cronshaw et al. | |
| 4,286,322 A | 8/1981 | Hoffman et al. | |
| 7,082,494 B1 | 7/2006 | Thelin et al. | |
| 7,155,716 B2 | 12/2006 | Hooman et al. | |
| 7,240,135 B2 | 7/2007 | Bai et al. | |
| 7,353,285 B2 | 4/2008 | Bai et al. | |
| 7,426,728 B2 | 9/2008 | Ruemmler et al. | |
| 7,844,970 B2 | 11/2010 | Theurer | |
| 7,849,044 B2 * | 12/2010 | Nelken | H04M 3/5238 379/265.06 |
| 7,873,153 B2 | 1/2011 | Bukovec et al. | |
| 8,140,876 B2 | 3/2012 | Arnold et al. | |
| 8,209,703 B2 | 6/2012 | Yee et al. | |
| 8,424,007 B1 * | 4/2013 | Hernacki | G06F 9/4881 718/103 |

(Continued)

*Primary Examiner* — David R Lazaro

(57) ABSTRACT

A system for prioritizing a plurality of requests received from a plurality of clients is disclosed. The system receives the plurality of requests. For each request from the plurality of requests, the system extracts features of the request, where the extracted features provide information regarding a priority in performing the request. The extracted features correspond to a numerical representation of the request, such that if a priority level associated with the request is high the numerical representation comprises higher numerical values compared to another request that is associated with a low priority level. The system determines a prioritization in performing the plurality of requests by ranking a plurality of extracted features representing the plurality of requests based on ranking numerical values associated with the plurality of extracted features.

20 Claims, 4 Drawing Sheets

(56) References Cited

U.S. PATENT DOCUMENTS

| | | |
|---|---|---|
| 8,468,533 B2 | 6/2013 | Miyazaki et al. |
| 8,510,737 B2 | 8/2013 | Kunjithapatham et al. |
| 8,539,493 B1 | 9/2013 | Robertson et al. |
| 8,554,776 B1 | 10/2013 | Barak et al. |
| 8,756,599 B2 * | 6/2014 | Devarakonda ........ G06F 9/5077 718/1 |
| 8,849,690 B1 | 9/2014 | Yang et al. |
| 8,887,164 B2 | 11/2014 | Conner et al. |
| 9,229,716 B2 | 1/2016 | Francois et al. |
| 9,229,765 B2 | 1/2016 | Lee et al. |
| 9,256,471 B2 | 2/2016 | Kim et al. |
| 9,336,043 B2 | 5/2016 | Preston |
| 9,400,963 B1 | 7/2016 | Morlen |
| 9,417,912 B2 | 8/2016 | Suh et al. |
| 9,485,301 B2 | 11/2016 | Werneke |
| 9,594,593 B2 | 3/2017 | Lim et al. |
| 9,632,826 B2 | 4/2017 | Edelstein et al. |
| 9,740,525 B2 | 8/2017 | Scheuer |
| 9,838,537 B2 | 12/2017 | Ristock et al. |
| 9,898,341 B2 | 2/2018 | Chang et al. |
| 9,934,476 B2 | 4/2018 | Fitzpatrick et al. |
| 10,089,142 B2 | 10/2018 | Plattner et al. |
| 10,133,598 B2 * | 11/2018 | Plondke .............. G06F 9/45558 |
| 10,242,218 B2 | 3/2019 | Werneke et al. |
| 10,755,195 B2 * | 8/2020 | Motahari Nezhad ........................ G06Q 10/1095 |
| 10,776,732 B2 | 9/2020 | Guha et al. |
| 2004/0136720 A1 | 7/2004 | Mahowald et al. |
| 2005/0097256 A1 | 5/2005 | Jones |
| 2005/0108074 A1 | 5/2005 | Bloechl et al. |
| 2006/0161922 A1 | 7/2006 | Amano et al. |
| 2006/0195847 A1 | 8/2006 | Amano et al. |
| 2010/0004941 A1 * | 1/2010 | Chang ................... G06Q 10/06 705/1.1 |
| 2013/0007662 A1 | 1/2013 | Bank et al. |
| 2013/0074088 A1 | 3/2013 | Purcell et al. |
| 2013/0091226 A1 * | 4/2013 | Brdiczka ................ G06Q 10/10 709/206 |
| 2014/0032257 A1 | 1/2014 | Houle |
| 2017/0193349 A1 * | 7/2017 | Jothilingam ............ G06N 20/20 |
| 2018/0103088 A1 * | 4/2018 | Blainey ............... H04L 67/1001 |
| 2019/0294468 A1 * | 9/2019 | Herring ................. G06F 9/4831 |
| 2019/0303197 A1 * | 10/2019 | Li ........................ G06K 9/6217 |
| 2020/0133724 A1 | 4/2020 | Chen et al. |
| 2020/0143330 A1 | 5/2020 | Perumalla et al. |
| 2020/0341816 A1 * | 10/2020 | Zheng ................... G06F 9/5038 |
| 2021/0073291 A1 * | 3/2021 | Hunter ................ G06F 9/44505 |

* cited by examiner

SYSTEM AND METHOD FOR PRIORITIZATION OF TEXT REQUESTS IN A QUEUE BASED ON CONTEXTUAL AND TEMPORAL VECTOR ANALYSIS

TECHNICAL FIELD

The present disclosure relates generally to task prioritization and digital processing systems, and more specifically to a system and method for prioritization of text requests in a queue based on contextual and temporal vector analysis.

BACKGROUND

Requests that clients send to an organization may have different aspects of priorities. For example, a request may be a time-sensitive request with a particular deadline. In another example, a request may have been in a queue for processing for a long period of time. Prioritizing the requests statically and not accounting for different aspects of priorities of the requests may lead to missing deadlines, neglecting requests at the end of the queue, and missing opportunities to improve relationships with clients. Current task prioritization and digital data processing technologies may not be configured to provide a reliable and efficient solution to determine the prioritization of requests received from clients based on their corresponding different aspects of priorities.

SUMMARY

Current task prioritization and digital processing systems may not be configured to provide a reliable and efficient solution to determine the prioritization of requests received from clients based on their corresponding priorities. The present disclosure contemplates systems and methods for prioritizing the requests based on their corresponding different aspects of priorities by analyzing the requests and extracting temporal and contextual features. The disclosed system may also extract client metadata features from the historical data of the client. The clients may comprise any company and/or individual that is interested in acquiring services and/or products provided by an organization associated with the disclosed system.

The temporal features may provide information about how long the request has been in a queue for processing. For example, the disclosed system may determine how long the request has been in the queue by determining a timestamp that showed when the request was received. The temporal features may further provide information about past requests received from the client from which the request is received.

The contextual features may provide information about the context of the request. For example, the contextual features may indicate that the requested task in the request (e.g., to purchase a product and/or a service), a client type (e.g., a particular company, individual, etc.), a client background (e.g., food industry, oil industry, etc.), a deadline for performing the request, a compensation amount that would be provided to the organization associated with the disclosed system upon performing the request, a transaction amount that corresponds to the worth of the requested task, among others.

In another example, the contextual features may indicate the sentiment, semantic, and tone of the request. In this example, the disclosed system may determine one or more indications in the sentiment, semantic, and tone of the request indicating that the request is urgent. For example, the disclosed system may detect one or more words, such as "high priority," "urgent," "important," and the like, that indicate that the request is urgent.

In some cases, determining a trend in the past requests received from the client may provide further insight to determine a priority level of the request compared to other requests. As such, the disclosed system may analyze historical data associated with the client and extract client metadata features from the historical data to determine the trend in the past requests received from the client. For example, the client metadata features may indicate that the trend in the past requests received from the client indicates success or failure.

The disclosed system uses this information to assign weight values to the temporal, contextual, and client metadata features. For example, regarding the temporal features, if the disclosed system determines that the request has been in a queue for processing for more than a threshold period of time, the disclosed system may assign a high weight value to a temporal feature. In another example, regarding the contextual features, if the disclosed system determines that the deadline for performing the request is below a particular period of time (e.g., five days, six days, etc.), the disclosed system may assign a high weight value to a contextual feature. In another example, regarding the contextual features, if the disclosed system determines that the compensation and/or transaction amounts are above a threshold amount, the disclosed system may assign a high weight value to a contextual feature. In another example, regarding the client metadata features, if the disclosed system determines that the trends in the past requests received from the client indicate success, the disclosed system may assign a high weight value to a client metadata feature.

The disclosed system may assign weight values to each of the temporal, contextual, and client metadata features by feeding each of them to a neural network. In this process, the disclosed system generates temporal data embeddings from processing the temporal features, contextual data embeddings from processing the contextual features, and client metadata embeddings from processing the client metadata features.

The disclosed system may fuse or concatenate the temporal, contextual, and client metadata features to generate a unified-format embedding, or fused embedding. The fused embedding may comprise a large number of numerical values (i.e., dimensions). Thus, the disclosed system may compress the fused embedding by feeding the fused embedding to an encoder, where the encoder may comprise a neural network. Thus, the encoder generates an encoded feature embedding that is the compressed fused embedding.

To determine whether the encoded feature corresponds to the fused embedding, the disclosed system feeds the encoded feature embedding to a decoder to reconstruct or uncompress the encoded feature embedding. Then, the disclosed system compares the decoded feature embedding with the fused embedding. The decoder may comprise a neural network that is a mirror of the neural network used in the encoder. Thus, if the disclosed system determines that the decoded feature embedding corresponds to the fused embedding, the disclosed system determines that the encoded feature embedding corresponds to the fused embedding. In this case, the disclosed system returns the encoded feature embedding as a request vector that is a numerical representation of the request indicating an urgency or priority level of the request. The process of generating the request vector is described in FIG. 2.

The request vector comprises numerical values representing the extracted features and their weight values. As such, if the request vector comprises higher numerical values than another request vector, the disclosed system prioritizes the request vector over the other request vector. In this way, the disclosed system may rank the request vectors based on their numerical values. In other words, the disclosed system determines a prioritization between the request vectors by ranking them based on their numerical values. The process of determining a prioritization between the request vectors is described in FIG. 3. In this process, the disclosed system applies a mathematical function to each request vector, such as a sum of squared roots. If the disclosed system determines that the result from applying the mathematical function to a request vector is above a threshold score value, the disclosed system adds the request vector to a list of top priority request vectors. Otherwise, the disclosed system processes another request vector.

In an embodiment, a system for prioritizing a plurality of requests received from a plurality of clients comprises a memory and a processor. The memory is operable to store a plurality of requests received from a plurality of clients, where the plurality of requests comprises a plurality of text. The plurality of requests comprises a first request from a first client to perform a first task, and a second request from a second client to perform a second task.

The processor is operably coupled with the memory. The processor is configured to receive the plurality of requests. For each request from the plurality of requests, the processor extracts features of the request, where the extracted features provide information regarding a priority in performing the request. The extracted features correspond to a numerical representation of the request, such that if a priority level associated with the request is high the numerical representation comprises higher numerical values compared to another request that is associated with a low priority level.

The processor determines a prioritization in performing the plurality of requests. In this process, the processor ranks a plurality of extracted features representing the plurality of requests based at least in part upon ranking numerical values associated with the plurality of extracted features, such that if a first set of extracted features from the plurality of extracted features that represents the first request comprises higher numerical values than a second set of extracted features representing the second request, the first request is prioritized over the second request.

The disclosed system provides several practical applications and technical advantages which include: 1) technology that extracts temporal and contextual features from requests; 2) technology that extracts a client's metadata from historical data associated with a client from which a request is received; 3) technology that determines an urgency or a priority level that each of the extracted features (i.e., the temporal, contextual, and client metadata features) adds to the overall priority level of the request, and assigns weight values to the extracted features based on the determined priority levels; 4) technology that generates a numerical representation of a request using the extracted features and their assigned weight values; and 5) technology that determines a prioritization between the requests by ranking the numerical representations of the requests.

As such, the system described in this disclosure may improve the task prioritization and digital data processing technologies by determining a prioritization between a plurality of requests based on temporal, contextual, and client metadata feature analysis. The disclosed system may be integrated into a practical application of improving the underlying operations of computer systems that serve to determine a prioritization between the plurality of requests.

For example, the disclosed system may decrease processing and time recourses to determine a prioritization between the plurality of requests that would otherwise be spent using the current task prioritization technologies.

The disclosed system may further be integrated into an additional practical application of performing the top-priority requests of clients before their corresponding deadlines, which improves the clients' relationships with the organization that received those top-priority requests.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
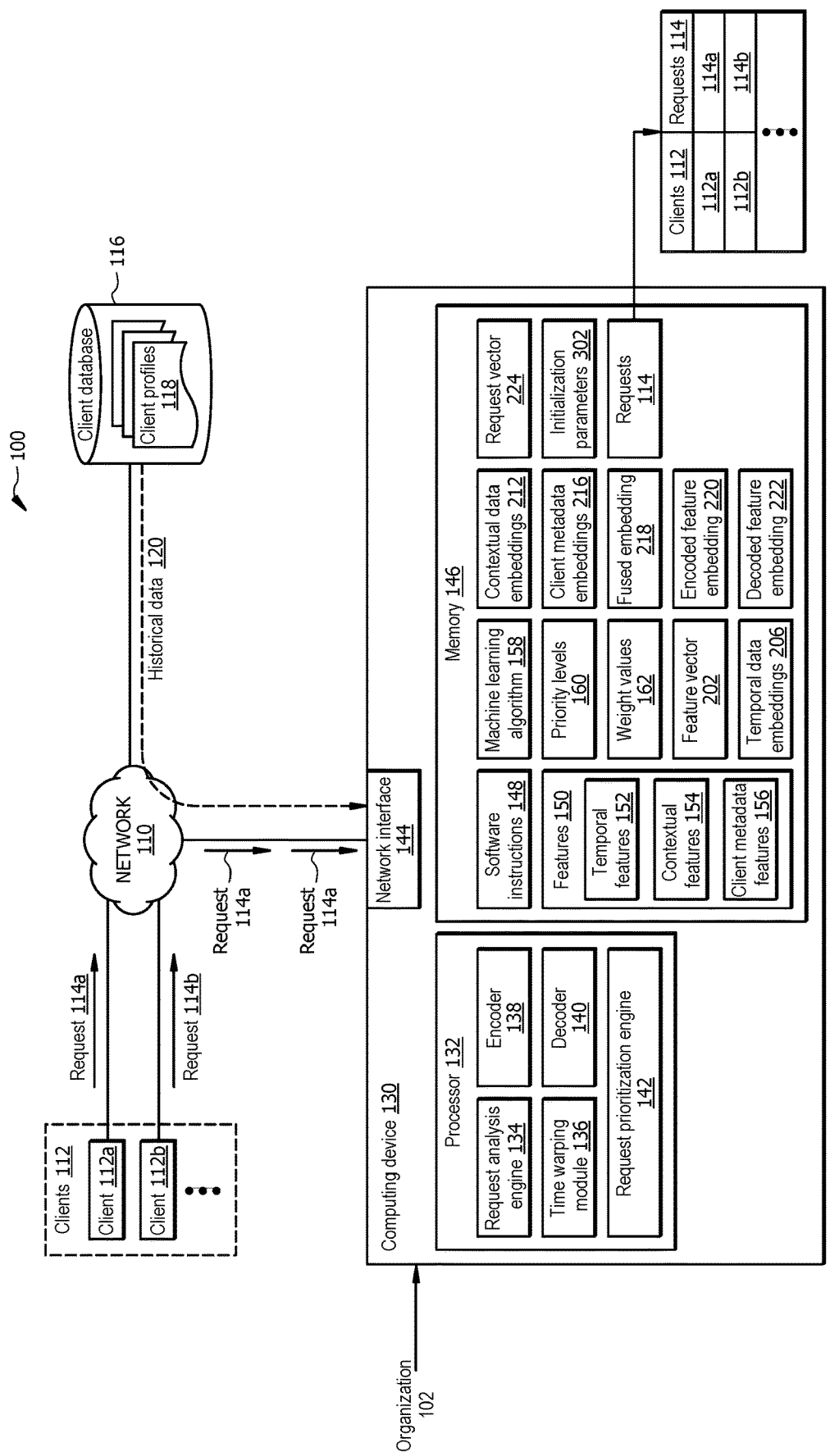
FIG. 1 illustrates an embodiment of a system configured to prioritize a plurality of requests received from a plurality of clients.

FIG. 1 illustrates one embodiment of a system 100 that is configured to prioritize a plurality of requests 114 received from a plurality of clients 112. In one embodiment, system 100 comprises a computing device 130. In some embodiments, system 100 may further comprise a client database 116 and a network 110 that enables communications between components of the system 100. The computing device 130 comprises a processor 132 in signal communication with a memory 146. Memory 146 comprises software instructions 148 that when executed by the processor 132 cause the processor 132 to perform one or more functions described herein. For example, when the software instructions 148 are executed, the processor 132 triggers one or more of a request analysis engine 134, a request prioritization engine 142, an encoder 138, a decoder 140, and a time-warping module 136 to determine a priority level 160 associated with each request 114 from the plurality of requests 114, and rank the plurality of requests 114 based on their determined priority levels 160. The client database 116 stores client profiles 118 that provide information that may be used by the software instructions 148 and/or the processor 132. In other embodiments, system 100 may not have all of the components listed and/or may have other elements instead of, or in addition to, those listed above.

In general, system 100 receives the plurality of requests 114 from the plurality of clients 112. For example, the plurality of requests 114 may comprise emails, text files, documents, etc. System 100 (via the request analysis engine 134) generates a numerical representation of each request 114. The numerical representation of each request 114 may be referred to as a request vector 224. The process of generating a request vector 224 is described in FIG. 2. In brief, in this process, the request analysis engine 134 extracts features 150 from a request 114 and historical data 120 associated with a client 112 from which the request 114 is received. The extracted features 150 may include temporal features 152, contextual features 154, and client metadata features 156. For example, the request analysis engine 134 may use a machine learning algorithm 158 to extract the features 150. The extracted features 150 provide information regarding an urgency or priority of performing the request 114. The request analysis engine 134 processes each extracted feature 150 to assign a weight value 162 to each extracted feature 150, where a weight value 162 assigned to a particular feature 150 indicates a priority level 160 that the particular feature 150 contributes or adds to the overall priority level 160 associated with the request 114. The request analysis engine 134 uses this information to generate the request vector 224. The request vector 224 comprises numerical values that are determined such that if an urgency or priority level 160 associated with the request 114 is determined to be high, the request vector 224 comprises higher numerical values compared to another request vector 224 that is determined to have a lower urgency or a lower priority level 160. System 100 (via the request prioritization engine 142) prioritizes the request vectors 224 by ranking the request vectors 224 based on their numerical values. The process of prioritizing the request vectors 224 is described in FIG. 3.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Clients 112 generally may comprise any company and/or individual. For example, the clients 112 may comprise companies and/or individuals who are interested in acquiring services and/or products provided by an organization 102. Clients 112 may send requests 114 to organization 102, for example, to the computing device 130 that is associated with organization 102 to request that the organization 102 perform a task, such as perform a service, provide a product, etc. For example, a first client 112a may send a first request 114a to the computing device 130 to request that the organization 102 perform a first task, and a second client 112b may send a second request 114b to the computing device 130 to request that the organization 102 perform a second task. Clients 112 may send their requests 114 to the computing device 130 through network 110.

Requests 114 may comprise a text-based request, voice-based request, and the combination of the two. For example, the first request 114 may comprise an email, a document, a text file, a text message (sent via a phone), and the like. In another example, the second request 114 may comprise a voice message, a phone call, etc. A request 114 may include one or more indications, such as a date it was received at the computing device 130, a date it was sent, a deadline for performing the request 114, client type (e.g., a particular company, individual, etc.), client background (e.g., food industry, oil industry, etc.), a transaction amount, a compensation amount, among others. The transaction amount may indicate the worth of the request 114. The compensation amount may indicate an amount that would be provided to the organization 102 upon performing the request 114. The request analysis engine 134 may use the one or more indications to assign weight values 162 to the features 150. For example, from the timestamp of reception of the request 114, the request analysis engine 134 may determine an aging factor of the request 114 that indicates how long the request 114 has been in a queue for processing. As such, if the request analysis engine 134 determines that the request 114 has been in the queue for more than a threshold period of time, it may assign a high weight value 162 to a temporal feature 152 associated with the request 114. Other examples are described in FIG. 2.

Client database 116 generally comprises any storage architecture that is used to store client profiles 118 associated with the clients 112. Examples of the client database 116, include, but are not limited to, a network-attached storage, a storage area network, and a storage assembly directly (or indirectly) coupled to the computing device 130.

Client profiles 118 may comprise historical data 120 associated with the clients 112. For example, a client profile 118 associated with a client 112 may comprise past requests 114, priority levels 160 associated with the past requests 114, client type, client background, among others.

Computing device 130 is generally any device that is configured to process data and interact with users. Examples of computing device 130 include, but are not limited to, a personal computer, a desktop computer, a workstation, a server, a laptop, a tablet computer, a mobile phone (such as smartphones), etc. In a particular example, the computing device 130 may be a desktop computer that is associated with the organization 102 that provides products and/or services to clients 112.

Processor 132 comprises one or more processors operably coupled to the memory 146. The processor 132 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations, processor 132 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to implement the request analysis engine 134, time-warping module 136, encoder 138, decoder 140, and request prioritization engine 142. In this way, processor 132 may be a special-purpose computer designed to implement the functions disclosed herein. In an embodiment, the processor 132 is implemented using logic units, FPGAs, ASICs, DSPs, or any other suitable hardware. The processor 132 is configured to operate as described in FIGS. 1-4. For example, the processor 132 may be configured to perform one or more steps of method 400 as described in FIG. 4.

Network interface 144 is configured to enable wired and/or wireless communications (e.g., via network 110). The network interface 144 is configured to communicate data between the computing device 130 and other devices, servers, databases (e.g., client database 116), systems, or domains. For example, the network interface 144 may comprise a WIFI interface, a local area network (LAN) interface, a wide area network (WAN) interface, a modem, a switch, or a router. The processor 132 is configured to send and receive data using the network interface 144. The network interface 144 may be configured to use any suitable type of communication protocol as would be appreciated by one of ordinary skill in the art.

Memory 146 may be volatile or non-volatile and may comprise a read-only memory (ROM), random-access memory (RAM), ternary content-addressable memory (TCAM), dynamic random-access memory (DRAM), and static random-access memory (SRAM). Memory 146 may be implemented using one or more disks, tape drives, solid-state drives, and/or the like. Memory 146 is operable to store the requests 114, software instructions 148, features 150, machine learning algorithm 158, priority levels 160, weight values 162, feature vectors 202, temporal data embeddings 206, contextual data embeddings 212, client metadata embeddings 216, fused embeddings 218, encoded feature embedding 220, decoded feature embedding 222, request vectors 224, initialization parameters 302, and/or any other data or instructions. The software instructions 148 may comprise any suitable set of instructions, logic, rules, or code operable to execute the processor 132.

Request Analysis Engine

Figure 2:
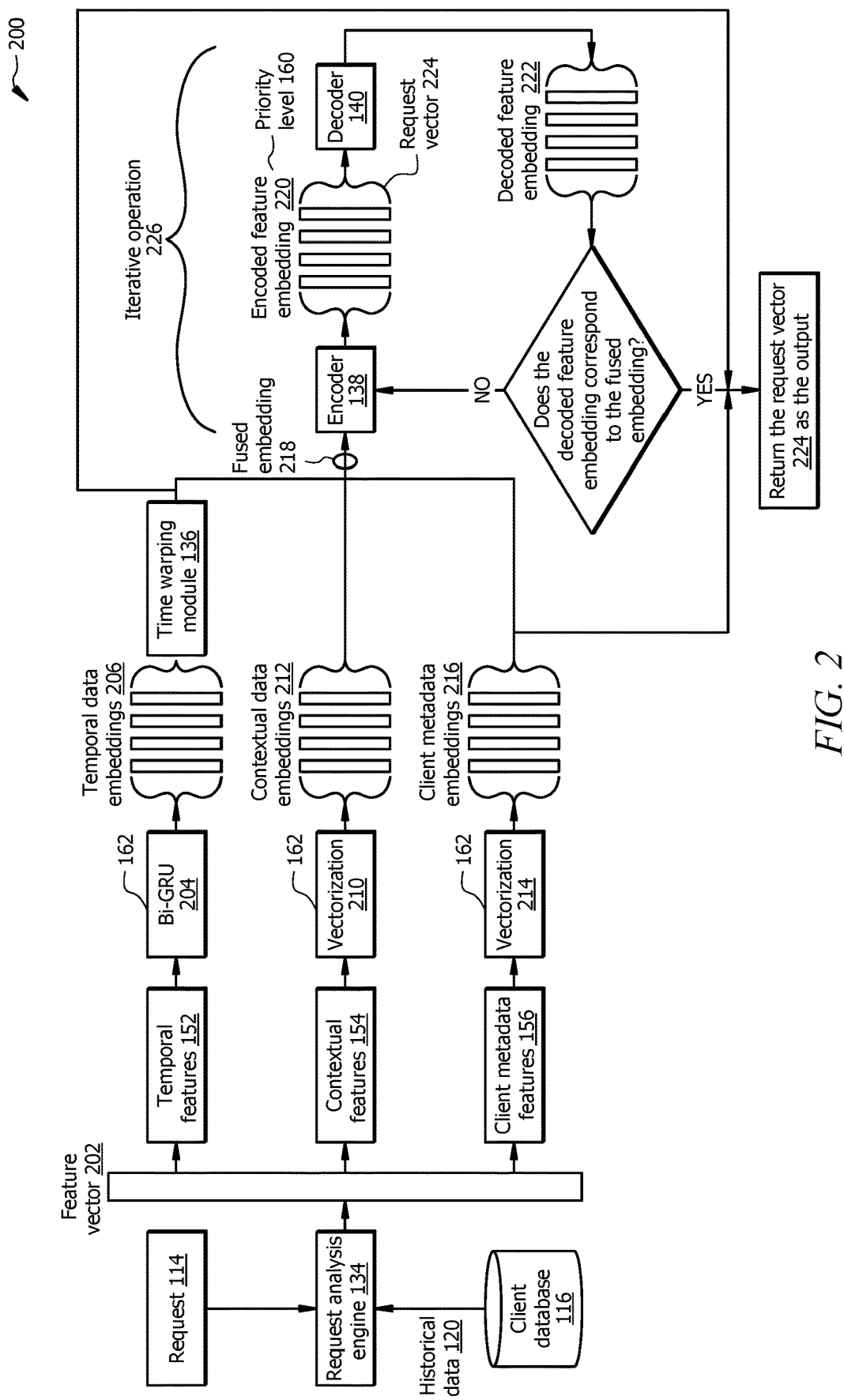
FIG. 2 illustrates an example operational flow for analyzing a request and generating a request vector.

Request analysis engine 134 may be implemented by the processor 132 executing software instructions 148, and is generally configured to analyze a request 114 and generate a request vector 224 that is a numerical representation of the request 114 whose numerical values represent features 150 and a priority level 160 associated with the request 114. In one embodiment, the request analysis engine 134 may use the time-warping module 136, encoder 138, and decoder 140 to perform one or more functions described herein. An example operational flow 200 describing analyzing a request 114 and generating a request vector 224 is illustrated in FIG. 2. In brief, to generate a request vector 224 for a request 114, the request analysis engine 134 processes the request 114 and historical data 120 associated with a client 112 from which the request 114 was received to extract their features 150. In some cases, the historical data 120 associated with the client 112 may not be provided in the request 114. As such, the request analysis engine 134 may extract features 150 from the historical data 120 as well as the request 114. For example, the request analysis engine 134 may extract the temporal features 152, contextual features 154, and client metadata features 156. The temporal features 152 may provide information about how long the request 114 has been in a queue for processing and the past requests 114 received from the client 112 from which the request 114 is received. The contextual features 154 may provide information about the context of the request 114. The client metadata features 156 may provide information about the client 112 from which the request 114 is received.

In one embodiment, the request analysis engine 134 may implement a machine learning algorithm 158 to perform one or more functions described herein. For example, the request analysis engine 134 may implement a Natural Language Processing (NLP) algorithm to extract features 150 from the request 114 and the historical data 120. In an example where a request 114 comprises a voice-based request, the request analysis engine 134 may implement an audio processing technique to transcribe the request 114 into text, and then use NLP to extract features 150 from the request 114. Similarly, the request analysis engine 134 may use an audio processing technique to transcribe a historical data 120 to transcribe the historical data 120 into text, and then use NLP to extract features 150 from the historical data 120. In extracting the features 150, the request analysis engine 134 may use sentence segmentation, sentence tokenization, word segmentation, word tokenization, semantic analysis, sentiment analysis, among other NLP techniques.

The request analysis engine 134 processes each extracted feature 150 to determine its corresponding priority level 160, and assign a weight value 162 to each extracted feature 150 based on the corresponding priority level 160. Examples of assigning weight values 162 to the extracted features 150 are described in FIG. 2. During this process, the request analysis engine 134 generates a temporal data embedding 206 by processing the temporal features 152, a contextual data embedding 212 by processing the contextual features 154, and a client metadata embedding 216 by processing the client metadata features 156. The temporal data embedding 206, contextual data embedding 212, and the client metadata embedding 216 comprise numerical values that represent their corresponding features 150 and weight values 162. Each of the temporal data embedding 206, contextual data embedding 212, and the client metadata embedding 216 represents a different aspect of the priority level 160 associated with the request 114.

The request analysis engine 134 generates the fused embedding 218 by fusing or concatenating the temporal data embedding 206, contextual data embedding 212, and the client metadata embedding 216. The fused embedding 218 may comprise a large number of dimensions (i.e., numerical values). As such, the fused embedding 218 is fed to the encoder 138 to reduce the dimension of the fused embedding 218 or compress the fused embedding 218.

The request analysis engine 134 determines whether the output of the encoder 138 (i.e., the encoded feature embedding 220) corresponds to the fused embedding 218 by using the decoder 140 that is configured to reconstruct the fused embedding 218. If the request analysis engine 134 determines that the output of the decoder 140 (i.e., the decoded feature embedding 222) corresponds to the fused embedding 218, the request analysis engine 134 returns the encoded feature embedding 220 as the request 224. The request vector 224 comprises numerical values that are determined such that if an urgency or priority level 160 associated with the request 114 is determined to be high, the request vector 224 comprises higher numerical values compared to another request vector 224 that is determined to have a lower urgency or a lower priority level 160.

Time-Warping Module

Time-warping module 136 may be implemented by the processor 132 executing software instructions 148, and is generally configured to extrapolate historical data 120 associated with a client 112 to determine what the historical data 120 would correspond to before the historical data 120 that is available in the client profile 118. In one embodiment, the time-warping module 136 may comprise a neural network. For example, the time-warping module 136 may be implemented by a Linear Regression and/or other regression techniques. As such, the time-warping module 136 may linearly regress the historical data 120 into the past to determine what the historical data 120 would correspond to before the data provided in the historical data 120.

In some cases, the time-warping module 136 may determine a shortage of data in the historical data 120. For example, assume that the first client 112a has started to send requests 114 to the organization 102 for a month. Thus, the historical data 120 (associated with the first client 112*a*) includes information about the past requests 114 sent from the last month. Also, assume that the second client 112*b* has started to send their requests 114 to the organization 102 for a longer time, for example, a year. This imbalance in historical data 120 associated with different clients 112 may affect prioritizing the requests 114 received from different clients 112. As such, the time-warping module 136 may extrapolate historical data 120 associated with the first client 112*a* prior to the last month (that is currently included in the historical data 120). In other words, in this example, the time-warping module 136 may determine what the historical data 120 would correspond to before the last month. The time-warping module 136 may apply the regression on the temporal data embeddings 206 to account for imbalance in historical data 120 for different clients 112 as described in FIG. 2.

Encoder

Encoder 138 may be implemented by the processor 132 executing software instructions 148, and is generally configured to reduce the dimension of the fused embedding 218 by compressing the fused embedding 218. In one embodiment, the encoder 138 may comprise a neural network. Thus, the encoder 138 generates the encoded feature embedding 220 that represents the fused embedding 218 with a reduced dimension, i.e., a compressed fused embedding 218.

Decoder

Decoder 140 may be implemented by the processor 132 executing software instructions 148, and is generally configured to uncompress or reconstruct the encoded feature embedding 220. In one embodiment, the decoder 140 may comprise a neural network. As such, the decoder 140 may generate the decoded feature embedding 222 that represents reconstructed encoded feature embedding 220.

Request Prioritization Engine

Figure 3:
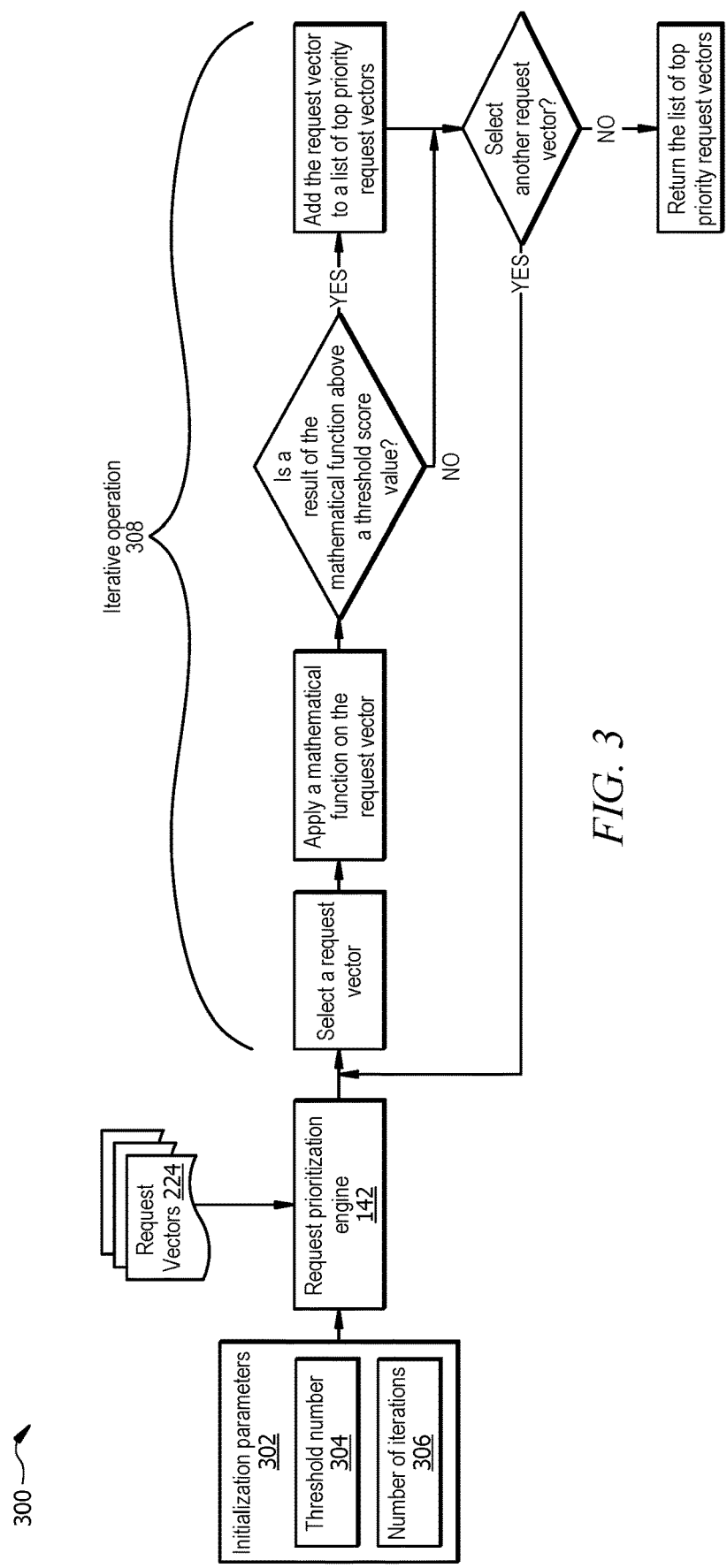
FIG. 3 illustrates an example operational flow for determining a prioritization among request vectors of FIG. 3.

Request prioritization engine 142 may be implemented by the processor 132 executing software instructions 148, and is generally configured to determine a prioritization between the vector requests 114 generated by the request analysis engine 134. In one embodiment, the request prioritization engine 142 may determine the prioritization between the vector requests 114 by ranking the vector requests 114 based on their corresponding numerical values and priority levels 160. An example operational flow 300 describing determining a prioritization among the request vectors 224 is illustrated in FIG. 3. In brief, the request prioritization engine 142 is provided the initialization parameters 302 to determine a particular number of request vectors 224 that are ranked above other request vectors 224, such as top ten vector requests 114. The request prioritization engine 142 applies a mathematical function to each request vector 224 and determines its result. If the result is above a threshold score value, the request prioritization engine 142 adds the request vector 224 to the list of top priority request vectors 224. The request prioritization engine 142 repeats this process until the particular number of top priority request vectors 224 are determined.

Example Operational Flow for Generating a Request Vector

FIG. 2 illustrates an example operational flow 200 describing analyzing a request 114 and generating a request vector 224. The operational flow 200 begins when the request analysis engine 134 receives the request 114. For example, the request analysis engine 134 may receive the request 114 when the request 114 is arrived at the computing device 130. The request analysis engine 134 may monitor incoming emails in an email box and voice messages in a voicemail box to receive the request 114. The request analysis engine 134 may fetch historical data 120 associated with the client 112 from which the request 114 was received from the client database 116. The request analysis engine 134 processes the request 114 and historical data 120, and extracts their features 150, for example, using an NLP technique, similar to that described in FIG. 1. The extracted features 150 may be represented by numerical values in the feature vector 202. In other words, the request analysis engine 134 generates the feature vector 202 that comprises numerical values representing features 150 and the historical data 120. The feature vector 202 may comprise temporal features 152, contextual features 154, and client metadata features 156.

The request analysis engine 134 assigns weight values 162 to the extracted features 150, where the weight values 162 indicate an urgency or a priority level 160 associated with each feature 150. In this process, the request analysis engine 134 generates the temporal data embeddings 206, contextual embeddings 212, and client metadata embeddings 216. If the request analysis engine 134 determines that a priority level 160 associated with a feature 150 is high, that feature 150 is represented by a high numerical value in its corresponding embeddings, i.e., temporal data embeddings 206, contextual embeddings 212, or client metadata embeddings 216. As such, if the any of these embeddings 206, 212, 216 comprise high numerical values, it may contribute to determining that the request 114 is associated with a high priority level 160. The corresponding description below describes the temporal features 152, contextual features 154, and the client metadata features 156, and examples of assigning weight values 162 to each of the extracted features 150.

Temporal Features and Generating Temporal Data Embeddings

The request analysis engine 134 generates the temporal data embeddings 206 by processing the temporal features 152. In one embodiment, the request analysis engine 134 may feed the temporal features 152 to a neural network to generate the temporal data embeddings 206. For example, the request analysis engine 134 may feed the temporal features 152 into a plurality of neural network layers, Bidirectional Gated Recurrent Unit (Bi-GRU) layers, GRU layers, Long-short-Term-Memory (LSTM) layers, Bi-LSTM layers, and the like. In the illustrated example in FIG. 2, the request analysis engine 134 feeds the temporal features 152 into a plurality of Bi-GRU layers 204. During this process, the request analysis engine 134 may assign weight values 162 to the temporal features 152, where the weight values 162 indicate an urgency or a priority level 160 associated with each temporal feature 152. If the request analysis engine 134 determines that a priority level 160 associated with a temporal feature 152 is high, that temporal feature 152 is represented by a high numerical value (e.g., 8 out of 10) in the temporal data embeddings 206. Furthermore, during this process, the request analysis engine 134 may determine sequential relationships between the temporal features 152. For example, the request analysis engine 134 may determine a trend in the temporal features 152 in a time series from the present to past, and vice versa. As such, the temporal data embeddings 206 comprises numerical values representing the temporal features 152, their corresponding weight values 162, and sequential relationships between the temporal features 152. Examples of assigning weight values 162 to the temporal features 152 are described below.

Temporal features 152 may provide information about how long the request 114 has been in a queue for processing. The request analysis engine 134 may determine how long the request 114 has been in the queue from a timestamp of reception of the request 114. As such, the request analysis engine 134 may assign a high weight value 162 to a temporal feature 152, if it determines that the request 114 has been in the queue for processing for more than a threshold period of time (e.g., three days, five days, or any other appropriate duration).

The temporal features 152 may further provide information about the past requests 114 received from the client 112, such as their determined priority levels 160, transaction amounts, compensation amounts, a success or failure indication in each of the past requests 114, etc. For example, the request analysis engine 134 may determine information about the past request 114 of the client 112 by analyzing the historical data 120. In one example, the request analysis engine 134 may assign a high weight value 162 to a temporal feature 152, if it determines that a trend of the past requests 114 (received from the same client 112) indicates that the past requests 114 were determined to have high priority levels 160. In another example, the request analysis engine 134 may assign a high weight value 162 to a temporal feature 152, if it determines that an average transaction and/or compensation amounts in the past requests 114 (received from the same client) are above a threshold amount.

The request analysis engine 134 feeds the temporal data embeddings 206 to the time-warping module 136 to extrapolate what the temporal data embeddings 206 would correspond to for the time before the historical data 120 to account for imbalance in historical data 120 for different clients 112 as described in FIG. 1. The time-warping module 136 may regress the temporal data embeddings 206 into the past to determine what the temporal data embeddings 206 would correspond to before the data provided in the historical data 120.

Contextual Features and Generating Contextual Data Embeddings

The request analysis engine 134 generates the contextual data embeddings 212 by processing the contextual features 154. For example, the request analysis engine 134 may perform a vectorization 210 on the contextual features 154 to generate the contextual data embeddings 212. In the vectorization process 210, the request analysis engine 134 may feed the contextual features 154 to a neural network. During this process, the request analysis engine 134 may assign weight values 162 to the contextual features 154, where the weight values 162 indicate an urgency or a priority level 160 associated with each contextual feature 154. If the request analysis engine 134 determines that a priority level 160 associated with a contextual feature 154 is high, that contextual feature 154 is represented by a high numerical value (e.g., 9 out of 10) in the contextual data embeddings 212. Examples of assigning weight values 162 to the contextual features 154 are described below.

Contextual features 154 may provide information about the context of the request 114. For example, the contextual features 154 may provide information about a task requested in the request 114, transaction amount, compensation amount, the deadline for performing the requested task, etc. As such, in one example, the request analysis engine 134 may assign a high weight value 162 to a contextual feature 154, if it determines that the transaction amount and/or compensation amount detected in the request 114 are above a threshold amount. In another example, the request analysis engine 134 may assign a high weight value 162 to a contextual feature 154, if it determines that a duration from the present until the deadline for performing the requested task is below a threshold period of time (e.g., two days, one day, five hours, or other appropriate durations).

The contextual features 154 may further provide information about sentiment, semantic, and tone of the request 114. For example, the contextual features 154 may comprise an indication indicating that the request 114 is urgent determined from one or more words, such as "high priority," "urgent," "important," and the like. As such, the request analysis engine 134 may assign a high weight value 162 to a contextual feature, if it determines one or more such indications indicating an urgency or high priority level 160 for the request 114.

Client Metadata Features and Generating Client Metadata Embeddings

The request analysis engine 134 generates the client metadata embeddings 216 by processing the client metadata features 156. For example, the request analysis engine 134 may perform a vectorization 214 on the client metadata features 156 to generate the client metadata embeddings 216. In the vectorization process 214, the request analysis engine 134 may feed the client metadata features 156 to a neural network. During this process, the request analysis engine 134 may assign weight values 162 to the client metadata features 156, where the weight values 162 indicate an urgency or a priority level 160 associated with each client metadata feature 156. If the request analysis engine 134 determines that a priority level 160 associated with a client metadata feature 156 is high, that client metadata feature 216 is represented by a high numerical value (e.g., 7 out of 10) in the client metadata embeddings.

Client metadata features 156 may provide information about the client 112 from whom the request 114 is received. For example, the client metadata features 156 may comprise a background of the client 112 from whom the request 114 was received, their recent successful and failed transactions, acquisitions, etc. As such, in one example, the request analysis engine 134 may assign a high weight value 162 to a client metadata feature 156, if it determines that the recent success transactions and/or acquisitions of the client 112 indicate success.

Generating the Request Vector

Once the request 114 analysis has generated the temporal data embeddings 206, contextual data embeddings 212, and client metadata embeddings 216, the request analysis engine 134 may fuse or concatenate them to generate a fused embedding 218. The fused embedding 218 may have a large dimension or a large number of numerical values, for example, above a thousand numerical values. Furthermore, fused embeddings 218 generated from different requests 114 may have a different number of dimensions or maybe in different formats. As such, the request analysis engine 134 may reduce the dimension of fused embedding 218 by encoding the fused embedding 218 into a unified format. To this end, the request analysis engine 134 may feed the fused embedding 218 to the encoder 138. The encoder 138 generates the encoded feature embedding 220 that represents the fused embedding 218 with a reduced dimension, i.e., a compressed fused embedding 218.

The request analysis engine 134 may determine whether the encoded feature embedding 220 corresponds to the fused embedding 218 (prior to encoding). To this end, the request analysis engine 134 may feed the encoded feature embedding 220 to the decoder 140, and determine whether the decoded feature embedding 222 corresponds to the fused embedding 218. The decoder 140 generates the decoded feature embedding 222 that represents reconstructed encoded feature embedding 220.

The request analysis engine 134 compares the decoded feature embedding 222 with the fused embedding 218. If the request analysis engine 134 determines that the decoded feature embedding 222 corresponds to the fused embedding 218, the request analysis engine 134 returns the encoded feature embedding 220 as the request vector 224. In other words, the request analysis engine 134 determines that the encoded feature embedding 220 corresponds to the numerical representation of the request 114 indicating the priority level 160 associated with the request 114, where the numerical representation of the request 114 is referred to as the request vector 224. Otherwise, in an iterative operation 226, the encoder 138 generates a second encoded feature embedding 220, the decoder 140 generates a second decoded feature embedding 222, and the second decoded feature embedding 222 and the fused embedding 218 are compared. The request analysis engine 134 iteratively repeats the iterative operation 226 until the decoded feature embedding 222 corresponds to the fused embedding 218. After each iteration during the iterative operations 226, weigh and bias values of the plurality of neural network layers in the encoder 138 and/or decoder 140 are adjusted and refined based on success and failure of the comparison between the decoded feature embedding 222 and the fused embedding 218. With a similar operational flow 200, the request analysis engine 134 generates request vectors 224 for other requests 114.

The generated request vector 224 comprises numerical values that represent the priority level 160 associated with the request 114. If a first request vector 224 comprises higher numerical values than a second request vector 224, it is an indication that the first request vector 224 is associated with a higher priority level 160 than the second request vector 224. This information is used by the request prioritization engine 142 to rank the vector requests 114 based on their corresponding numerical values. Once the request vectors 224 are generated, the request analysis engine 134 feeds the request vectors 224 to the request prioritization engine 142 to determine a prioritization between the request vectors 224. This process is described in FIG. 3.

In some embodiments, the request analysis engine 134 may concatenate the client metadata embedding 216 and/or the temporal data embedding 206 with the request vector 224 to add an additional reference to the data provided in the client metadata embedding 216 and/or the temporal data embedding 206 in the request vector 224.

Example Operational Flow for Determining a Prioritization Among Request Vectors

FIG. 3 illustrates an example operational flow 300 describing determining a prioritization among the request vectors 224. The operational flow 300 begins when the request prioritization engine 142 receives the request vectors 224 and the initialization parameters 302. For example, the request prioritization engine 142 may receive the request vectors 224 from the request analysis engine 134, and the initialization parameters 302 from a user.

The initialization parameters 302 may comprise a particular or a threshold number 304 of request vectors 224 to be identified and added to a list of top priority request vectors 224. For example, the initialization parameters 302 may indicate that the top ten request vectors 224 are desired to be identified and added to the list of top priority request vectors 224. The initialization parameters 302 may further comprise a number of iterations 306 (e.g., one thousand times, two thousand times, etc.) to identify the threshold number 304 of request vectors 224, i.e., the list of top priority request vectors 224.

The request prioritization engine 142 selects a request vector 224 from the plurality of request vectors 224. The request prioritization engine 142 selects a request vector 224 from the plurality of request vectors 224 until there is no request vector 224 is left for evaluation. The request prioritization engine 142 applies a mathematical function to the request vector 224. For example, the request prioritization engine 142 determines a sum of squared roots of the numerical values in the request vector 224.

The request prioritization engine 142 determines whether the result from applying the mathematical function on the request vector 224 is above a threshold score value, e.g., five hundred or any other suitable value. In one embodiment, a threshold tolerance may be added to the threshold score value. For example, the threshold tolerance may be ±15%, ±20%, or any other appropriate percentage. If the request prioritization engine 142 determines that the result from applying the mathematical function on the request vector 224 is above the threshold score value, the request prioritization engine 142 adds the request vector 224 to the list of top priority request vectors 224. Otherwise, the request prioritization engine 142 determines whether to select another request vector 224 from the plurality of request vectors 224.

Once the request prioritization engine 142 adds the request vector 224 to the list of top priority request vectors 224, the request prioritization engine 142 determines whether to select another request vector 224. The request prioritization engine 142 selects another request vector 224 until at least one of the following conditions is met. The conditions are 1) the threshold number 304 of request vectors 224 to be added to the list of top priority request vectors 224 is reached, 2) the number of iterations 306 is reached, and 3) there is no more request vector 224 is left for evaluation. The request prioritization engine 142 repeats an iterative operation 308 until at least one of the above-mentioned conditions is met. If the request prioritization engine 142 determines that at least one of these conditions is met, the request prioritization engine 142 returns the list of top priority request vectors 224.

The request prioritization engine 142 may swap the request vector 224 (added to the list of top priority request vectors 224) with another request vector 224 whose result from applying the mathematical function is more than the request vector 224.

In some cases, even after repeating the iterative operation 308 with the number of iterations 306, the list of top priority request vectors 224 may not have the threshold number 304 of request vectors 224. For example, assume that the number of iterations 306 is one thousand, and the threshold number 304 of request vectors 224 is ten. Also, assume that after repeating the iterative operation 308 one thousand times, only two request vectors 224 are added to the list of top priority threshold number 304 of request vectors 224. In other words, in this exemplary scenario, only two request vectors 224 satisfied the condition of their results from applying the mathematical function being above the threshold score value. In such scenarios, the request prioritization engine 142 may adjust one or more of the number of iterations 306 (e.g., in this scenario increase the number of iterations 306) and the threshold score value (e.g., in this scenario decrease the threshold score value).

Example Method for Prioritizing a Plurality of Requests

Figure 4:
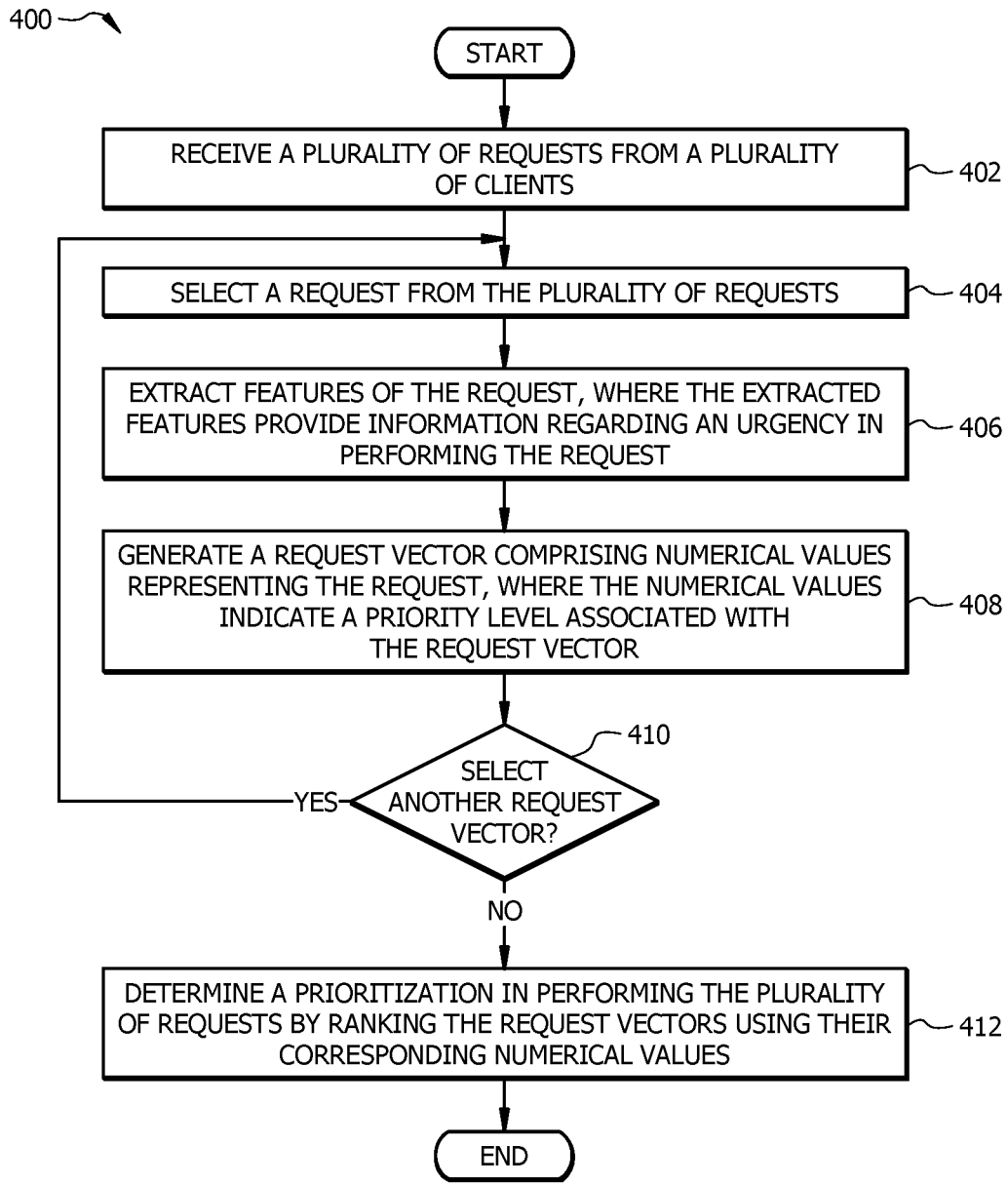
FIG. 4 illustrates an example flowchart of a method for prioritizing a plurality of requests received from a plurality of clients.

FIG. 4 illustrates an example flowchart of a method 400 for prioritizing a plurality of requests 114 received from a plurality of clients 112. Modifications, additions, or omissions may be made to method 400. Method 400 may include more, fewer, or other steps. For example, steps may be performed in parallel or in any suitable order. While at times discussed as the system 100, processor 132, request analysis engine 134, encoder 138, decoder 140, time-warping module 136, request prioritization engine 142, or components of any of thereof performing steps, any suitable system or components of the system may perform one or more steps of the method 400. For example, on or more steps of method 400 may be implemented, at least in part, in the form of software instructions 148 of FIG. 1, stored on non-transitory, tangible, machine-readable media (e.g., memory 146 of FIG. 1) that when run by one or more processors (e.g., processor 132 of FIG. 1) may cause the one or more processors to perform steps 402-412.

Method 400 begins at step 402 when the request analysis engine 134 receives the plurality of requests 114 from the plurality of clients 112. For example, the request analysis engine 134 may receive the plurality of requests 114 when the plurality of requests 114 are received at the computing device 130, e.g., at an email box, a voicemail box, etc., similar to that described in FIGS. 1 and 2.

At step 404, the request analysis engine 134 selects a request 114 from the plurality of requests 114. The request analysis engine 134 iteratively selects a request 114 until there is no request 114 left for processing.

At step 406, the request analysis engine 134 extracts features 150 from the request 114, where the extracted features 150 provide information regarding a priority in performing the request. In one embodiment, the request analysis engine 134 may also extract fractures 150 from historical data 120 associated with a client 112 from which the request 114 is received. For example, the request analysis engine 134 may extract temporal features 152, contextual features 154, and client metadata features 156, similar to that described in FIGS. 1 and 2.

At step 408, the request analysis engine 134 generates a request vector 224 comprising numerical values representing the request 114, where the numerical values indicate a priority level 160 associated with the request vector 224. For example, the request analysis engine 134 may implement the operational flow 200 described in FIG. 2 to generate the request vector 224.

At step 410, the request analysis engine 134 determines whether to select another request vector 224. The request analysis engine 134 determines to select another request vector 224 if at least one request vector 224 is left for processing. If the request analysis engine 134 determines that to select another request vector 224, method 400 returns to step 404. Otherwise, method 400 proceeds to step 412.

At step 412, the request prioritization engine 142 determines a prioritization in performing the plurality of requests 114 by ranking the request vectors 224 using their corresponding numerical values. For example, the request prioritization engine 142 may implement the operational flow 300 described in FIG. 3 to determine a prioritization in performing the plurality of requests 114.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for prioritizing a plurality of requests received from a plurality of clients, comprising:
  a memory operable to store a plurality of requests received from a plurality of clients each associated with a different organization; wherein:
    the plurality of requests corresponds to a plurality of text;
    the plurality of requests comprises:
      a first request from a first client to perform a first task; and
      a second request from a second client to perform a second task;
  a processor, operably coupled with the memory, configured to:
    receive the plurality of requests;
    for each request from the plurality of requests:
      extract features of the request, wherein:
        the extracted features provide information regarding a priority in performing the request; and
        the extracted features correspond to a numerical representation of the request such that if a priority level associated with the request is high the numerical representation comprises higher numerical values compared to another request that is associated with a low priority level;
      determine a prioritization in performing the plurality of requests by ranking a plurality of extracted features representing the plurality of requests based at least in part upon ranking numerical values associated with the plurality of extracted features, such that if a first set of extracted features from the plurality of extracted features that represents the first request comprises higher numerical values than a second set of extracted features representing the second request, the first request is prioritized over the second request.

2. The system of claim 1, wherein the processor is further configured to:
- encode the extracted features into a unified format, wherein encoding the extracted features comprises reducing a dimension associated with the extracted features;
- decode the encoded features, wherein decoding the encoded features comprises reconstructing the encoded features;
- compare the decoded features with the extracted features;
- determine whether the decoded features match the extracted features;
- in response to determining that the decoded features match the extracted features, determine that the encoded features correspond to the numerical representation of the request.

3. The system of claim 1, wherein the extracted features comprise contextual features that provide information regarding the request comprising one or more of:
- a sentiment associated with the request;
- a requested task associated with the request;
- a value of compensation for performing the requested task; and
- a deadline for performing the requested task.

4. The system of claim 3, wherein the processor is further configured to:
- determine whether the value of compensation for performing the requested task is above a threshold value; and
- in response to determining that the value of compensation for performing the requested task is above the threshold value, assign a high priority level to a first contextual feature from the contextual features.

5. The system of claim 3, wherein the processor is further configured to:
- determine whether a duration from the present until the deadline for performing the requested task is below a threshold period of time; and
- in response to determining that the duration from the present until the deadline for performing the requested task is below the threshold period of time, assign a high priority level to a second contextual feature from the contextual features.

6. The system of claim 1, wherein the extracted features comprise temporal features that provide information regarding how long the request has been in a queue for processing.

7. The system of claim 6, wherein the processor is further configured to:
- determine whether the temporal features indicate that the request has been in the queue for processing for over a threshold period of time; and
- in response to determining that the temporal features indicate that the request has been in the queue for over the threshold period of time, assign a high priority level to a temporal feature from the temporal features.

8. The system of claim 1, wherein determining the prioritization in performing the plurality of requests comprises:
- for each request from the plurality of requests:
  - applying a mathematical function to a numerical representation of the request corresponding to decoded features of the request, wherein the mathematical function comprises a sum of squared roots of values from the numerical representation;
  - determining whether a result from applying the mathematical function to the encoded features is above a threshold score value; and
  - in response to determining that the result from applying the mathematical function to the numerical representation is above the threshold score value, prioritizing the request above other requests from the plurality of requests whose results from applying the mathematical function are below the threshold score value.

9. A method for prioritizing a plurality of requests received from a plurality of clients, comprising:
- receiving a plurality of requests from a plurality of clients each associated with a different organization, wherein:
  - the plurality of requests corresponds to a plurality of text;
  - the plurality of requests comprises:
    - a first request from a first client to perform a first task; and
    - a second request from a second client to perform a second task;
- for each request from the plurality of requests:
- extracting features of the request, wherein:
  - the extracted features provide information regarding a priority in performing the request; and
  - the extracted features correspond to a numerical representation of the request such that if a priority level associated with the request is high the numerical representation comprises higher numerical values compared to another request that is associated with a low priority level;
- determining a prioritization in performing the plurality of requests by ranking a plurality of extracted features representing the plurality of requests based at least in part upon ranking numerical values associated with the plurality of extracted features, such that if a first set of extracted features from the plurality of extracted features that represents the first request comprises higher numerical values than a second set of extracted features representing the second request, the first request is prioritized over the second request.

10. The method of claim 9, further comprising:
- encoding the extracted features into a unified format, wherein encoding the extracted features comprises reducing a dimension associated with the extracted features;
- decoding the encoded features, wherein decoding the encoded features comprises reconstructing the encoded features;
- comparing the decoded features with the extracted features;
- determining whether the decoded features match the extracted features;
- in response to determining that the decoded features match the extracted features, determining that the encoded features correspond to the numerical representation of the request.

11. The method of claim 9, wherein the extracted features comprise contextual features that provide information regarding the request comprising one or more of:
- a sentiment associated with the request;
- a requested task associated with the request;
- a value of compensation for performing the requested task; and
- a deadline for performing the requested task.

12. The method of claim 11, further comprising:
- determining whether the value of compensation for performing the requested task is above a threshold value; and in response to determining that the value of compensation for performing the requested task is above the threshold value, assigning a high priority level to a first contextual feature from the contextual features.

13. The method of claim 11, further comprising:
determining whether a duration from the present until the deadline for performing the requested task is below a threshold period of time; and
in response to determining that the duration from the present until the deadline for performing the requested task is below the threshold period of time, assigning a high priority level to a second contextual feature from the contextual features.

14. The method of claim 9, wherein the extracted features comprise temporal features that provide information regarding how long the request has been in a queue for processing.

15. The method of claim 9, wherein the extracted features comprise client metadata features that provide information regarding a client from which the request is received, the client metadata features comprise one or more of:
historical records associated with the client comprising previous requests of the client; and
a type of an organization associated with the client.

16. A non-transitory computer-readable medium storing instructions that when executed by a processor, cause the processor to:
receive a plurality of requests from a plurality of clients each associated with a different organization, wherein:
the plurality of requests corresponds to a plurality of text;
the plurality of requests comprises:
a first request from a first client to perform a first task; and
a second request from a second client to perform a second task;
for each request from the plurality of requests:
extract features of the request, wherein:
the extracted features provide information regarding a priority in performing the request; and
the extracted features correspond to a numerical representation of the request such that if a priority level associated with the request is high the numerical representation comprises higher numerical values compared to another request that is associated with a low priority level;
determine a prioritization in performing the plurality of requests by ranking a plurality of extracted features representing the plurality of requests based at least in part upon ranking numerical values associated with the plurality of extracted features, such that if a first set of extracted features from the plurality of extracted features that represents the first request comprises higher numerical values than a second set of extracted features representing the second request, the first request is prioritized over the second request.

17. The non-transitory computer-readable medium of claim 16, wherein the instructions when executed by the processor, further cause the processor to:
encode the extracted features into a unified format, wherein encoding the extracted features comprises reducing a dimension associated with the extracted features;
decode the encoded features, wherein decoding the encoded features comprises reconstructing the encoded features;
compare the decoded features with the extracted features;
determine whether the decoded features match the extracted features;
in response to determining that the decoded features match the extracted features, determine that the encoded features correspond to the numerical representation of the request.

18. The non-transitory computer-readable medium of claim 16, wherein the extracted features comprise contextual features that provide information regarding the request comprising one or more of:
a sentiment associated with the request;
a requested task associated with the request;
a value of compensation for performing the requested task; and
a deadline for performing the requested task.

19. The non-transitory computer-readable medium of claim 18, wherein the instructions when executed by the processor, further cause the processor to:
determine whether the value of compensation for performing the requested task is above a threshold value; and
in response to determining that the value of compensation for performing the requested task is above the threshold value, assign a high priority level to a first contextual feature from the contextual features.

20. The non-transitory computer-readable medium of claim 18, wherein the instructions when executed by the processor, further cause the processor to:
determine whether a duration from the present until the deadline for performing the requested task is below a threshold period of time; and
in response to determining that the duration from the present until the deadline for performing the requested task is below the threshold period of time, assign a high priority level to a second contextual feature from the contextual features.

* * * * *